US012067843B2

(12) United States Patent
Davis et al.

(10) Patent No.: US 12,067,843 B2
(45) **Date of Patent: *Aug. 20, 2024**

(54) SYMBOL-DRIVEN INCREMENTATION OF PROGRESSIVE FEATURE PRIZES ACROSS MULTIPLE GAMES IN A MULTI-GAME PACKAGE

(71) Applicant: Aristocrat Technologies, Inc., Las Vegas, NV (US)

(72) Inventors: Blake Davis, Las Vegas, NV (US); Allon Englman, Las Vegas, NV (US)

(73) Assignee: Aristocrat Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/462,314

(22) Filed: Sep. 6, 2023

(65) Prior Publication Data

US 2024/0013622 A1 Jan. 11, 2024

Related U.S. Application Data

(63) Continuation of application No. 17/861,598, filed on Jul. 11, 2022, now Pat. No. 11,790,731.

(51) Int. Cl.
*G07F 17/32* (2006.01)

(52) U.S. Cl.
CPC ........ *G07F 17/3258* (2013.01); *G07F 17/326* (2013.01)

(58) Field of Classification Search
None
See application file for complete search history.

(56) References Cited

U.S. PATENT DOCUMENTS

| | | | |
|---|---|---|---|
| 6,032,955 | A | 3/2000 | Luciano |
| 6,224,484 | B1 | 5/2001 | Okuda |
| 6,776,715 | B2 | 8/2004 | Price |
| 7,753,784 | B2 | 7/2010 | Baerlocher |
| 7,771,276 | B2 | 8/2010 | Beatty |
| 7,862,427 | B2 | 1/2011 | Nguyen |

(Continued)

OTHER PUBLICATIONS

"IGT—New Concept MS Legends Pairs Games With Their Own SAP For Jackpot Shoppers," IGT, ClubIQ, Nov. 8, 2019, 4 pages.

(Continued)

*Primary Examiner* — Jason T Yen
(74) *Attorney, Agent, or Firm* — Blank Rome LLP

(57) ABSTRACT

A multi-game package environment for a gaming device includes at least a first and second game. The first game is eligible to trigger a payout of one or more first progressive feature prizes associated with the first game and ineligible to trigger a payout of one or more second progressive feature prizes associated with the second game. A first set of random-based game outcomes are generated for a round of play of the first game to randomly determine a bulk progressive feature prize update operation across at least one progressive feature prize of each of the games in the multi-game package. A second set of random-based game outcomes is generated to randomly determine whether one of the one or more first progressive feature prizes in the first game is triggered. Concurrently, an amount by which to update a visual meter associated with each updated progressive feature prize may be determined.

20 Claims, 10 Drawing Sheets

(56) References Cited

U.S. PATENT DOCUMENTS

| | | | | |
|---|---|---|---|---|
| 8,070,605 | B2 | 12/2011 | Tien | |
| 8,147,320 | B2 | 4/2012 | Englman | |
| 8,221,228 | B2 | 7/2012 | Anderson | |
| 8,257,167 | B2 | 9/2012 | Fujimori | |
| 8,323,101 | B2 | 12/2012 | Anderson | |
| 8,342,956 | B2 | 1/2013 | Anderson | |
| 8,348,755 | B2 | 1/2013 | Kelly | |
| 8,353,761 | B2 | 1/2013 | Kelly | |
| 8,360,869 | B2 | 1/2013 | Kelly | |
| 8,382,586 | B2 | 2/2013 | Kelly | |
| 8,414,389 | B2 | 4/2013 | Cahill | |
| 8,449,387 | B2 | 5/2013 | Englman | |
| 8,460,086 | B2 | 6/2013 | Joshi | |
| 8,535,147 | B2 | 9/2013 | Ward | |
| 8,545,308 | B2 | 10/2013 | Walker | |
| 8,585,494 | B2 | 11/2013 | Parrinello | |
| 8,622,813 | B2 | 1/2014 | Okada | |
| 8,651,946 | B1 | 2/2014 | Doyle | |
| 8,715,071 | B2 | 5/2014 | Keenan | |
| 8,740,710 | B2 | 6/2014 | Kelly | |
| 8,753,196 | B2 | 6/2014 | Baerlocher | |
| 8,821,265 | B2 | 9/2014 | Englman | |
| 9,039,522 | B2 | 5/2015 | Guan | |
| 9,053,602 | B2 | 6/2015 | Michaelson | |
| 9,189,921 | B2 | 11/2015 | Spencer | |
| 9,230,402 | B2 | 1/2016 | Green | |
| 9,311,779 | B2 | 4/2016 | Kelly | |
| 9,342,956 | B2 | 5/2016 | Hughes | |
| 9,355,521 | B2 | 5/2016 | King | |
| 9,378,608 | B2 | 6/2016 | Enzminger | |
| 9,430,904 | B2 | 8/2016 | Larsen | |
| 9,520,029 | B2 | 12/2016 | Guinn | |
| 9,672,694 | B2 | 6/2017 | Lowell | |
| 9,741,209 | B2 | 8/2017 | Aoki | |
| 9,824,531 | B2 | 11/2017 | Iyer | |
| 9,830,777 | B2 | 11/2017 | Yoseloff | |
| 9,990,804 | B2 | 6/2018 | Aoki | |
| 10,002,494 | B2 | 6/2018 | Saffari | |
| 10,008,072 | B2 | 6/2018 | Czyzewski | |
| 10,026,269 | B2 | 7/2018 | Upton | |
| 10,204,485 | B2 | 2/2019 | Korthauer | |
| 10,210,707 | B2 | 2/2019 | Suda | |
| 10,210,710 | B2 | 2/2019 | Lyons | |
| 10,311,674 | B2 | 6/2019 | Nicely | |
| 10,373,435 | B2 | 8/2019 | Yoseloff | |
| 11,354,978 | B2 | 6/2022 | O'Hara | |
| 2002/0190471 | A1 | 12/2002 | Vancura | |
| 2003/0222402 | A1* | 12/2003 | Olive | G07F 17/3267 463/20 |
| 2005/0239542 | A1 | 10/2005 | Olsen | |
| 2006/0142079 | A1 | 6/2006 | Ikehara | |
| 2006/0154718 | A1 | 7/2006 | Willyard | |
| 2006/0183535 | A1* | 8/2006 | Marks | G07F 17/3258 463/20 |
| 2007/0060321 | A1* | 3/2007 | Vasquez | G07F 17/32 463/27 |
| 2007/0191088 | A1 | 8/2007 | Breckner | |
| 2008/0125211 | A1* | 5/2008 | Plowman | G07F 17/3244 463/20 |
| 2009/0111561 | A1* | 4/2009 | Dewaal | G07F 17/32 463/20 |
| 2011/0195773 | A1 | 8/2011 | Michaelson | |
| 2011/0201416 | A1 | 8/2011 | Jaffe | |
| 2012/0108324 | A1 | 5/2012 | King | |
| 2013/0084950 | A1 | 4/2013 | Olsen | |
| 2013/0252723 | A1 | 9/2013 | Nicely | |
| 2014/0213348 | A1 | 7/2014 | Vasquez | |
| 2016/0217657 | A1 | 7/2016 | Halter | |
| 2016/0314657 | A1 | 10/2016 | Buchholz | |
| 2017/0024968 | A1 | 1/2017 | Saffari | |
| 2017/0221309 | A1 | 8/2017 | Hughes | |
| 2018/0005490 | A1 | 1/2018 | Reddicks | |
| 2018/0082531 | A1 | 3/2018 | Yoseloff | |
| 2018/0082533 | A1 | 3/2018 | Hallerbach | |
| 2018/0225924 | A1 | 8/2018 | Cohen | |
| 2022/0028218 | A1 | 1/2022 | Davis | |
| 2022/0383692 | A1* | 12/2022 | Lyons | G07F 17/3223 |

OTHER PUBLICATIONS

Office Action dated Aug. 19, 2021 for U.S. Appl. No. 16/940,104 (pp. 1-15).

Office Action (Non-Final Rejection) dated Nov. 23, 2021 for U.S. Appl. No. 16/826,124 (pp. 1-7).

Office Action (Final Rejection) dated Feb. 7, 2022 for U.S. Appl. No. 16/940,104 (pp. 1-17).

Office Action (Notice of Allowance and Fees Due (PTOL-85)) dated Mar. 2, 2022 for U.S. Appl. No. 16/826,124 (pp. 1-7).

Office Action (Non-Final Rejection) dated Jun. 9, 2022 for U.S. Appl. No. 16/940,104 (pp. 1-18).

Office Action (Final Rejection) dated Dec. 15, 2022 for U.S. Appl. No. 16/940,104 (pp. 1-14).

Office Action (Non-Final Rejection) dated Mar. 24, 2023 for U.S. Appl. No. 17/747,652 (pp. 1-7).

Office Action dated Apr. 17, 2023 for U.S. Appl. No. 16/940,104 (pp. 1-13).

Office Action (Final Rejection) dated Jul. 10, 2023 for U.S. Appl. No. 17/747,652 (pp. 1-9).

Notice of Allowance dated Jul. 21, 2023 for U.S. Appl. No. 17/861,598 (pp. 1-12).

Office Action (Non-Final Rejection) dated Oct. 20, 2023 for U.S. Appl. No. 17/747,652 (pp. 1-8).

Office Action (Non-Final Rejection) dated Nov. 8, 2023 for U.S. Appl. No. 16/940,104 (pp. 1-16).

* cited by examiner

SYMBOL-DRIVEN INCREMENTATION OF PROGRESSIVE FEATURE PRIZES ACROSS MULTIPLE GAMES IN A MULTI-GAME PACKAGE

TECHNICAL FIELD

The disclosure relates generally to the field of user interface (UI) design, electronic gaming devices, and electronic gaming software. More particularly, but not by way of limitation, this disclosure relates to performing gaming device operations that present and generate random based game outcomes for games within a multi-game package.

BACKGROUND

Electronic gaming devices, such as electronic gaming machines (EGMs), computers, or other mobile devices, provide a variety of wagering games such as slot games, video poker games, video blackjack games, roulette games, video bingo games, keno games and other types of games that are frequently offered at casinos and other locations. Play on electronic gaming devices typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the electronic gaming device and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Electronic gaming devices often depend on usability (e.g., ease of use and player understandability) and new or improved game features to enhance player experiences on the electronic gaming devices. Although previous electronic gaming devices include various UI features, game features, and backend game processing operations associated with the UI features to improve usability and enhance player experiences, there is a continuous need for further improvement to EGMs and other electronic gaming devices, electronic gaming software, and/or UI design.

DETAILED DESCRIPTION

I. Introduction

I.A. Overview

Figure 1:
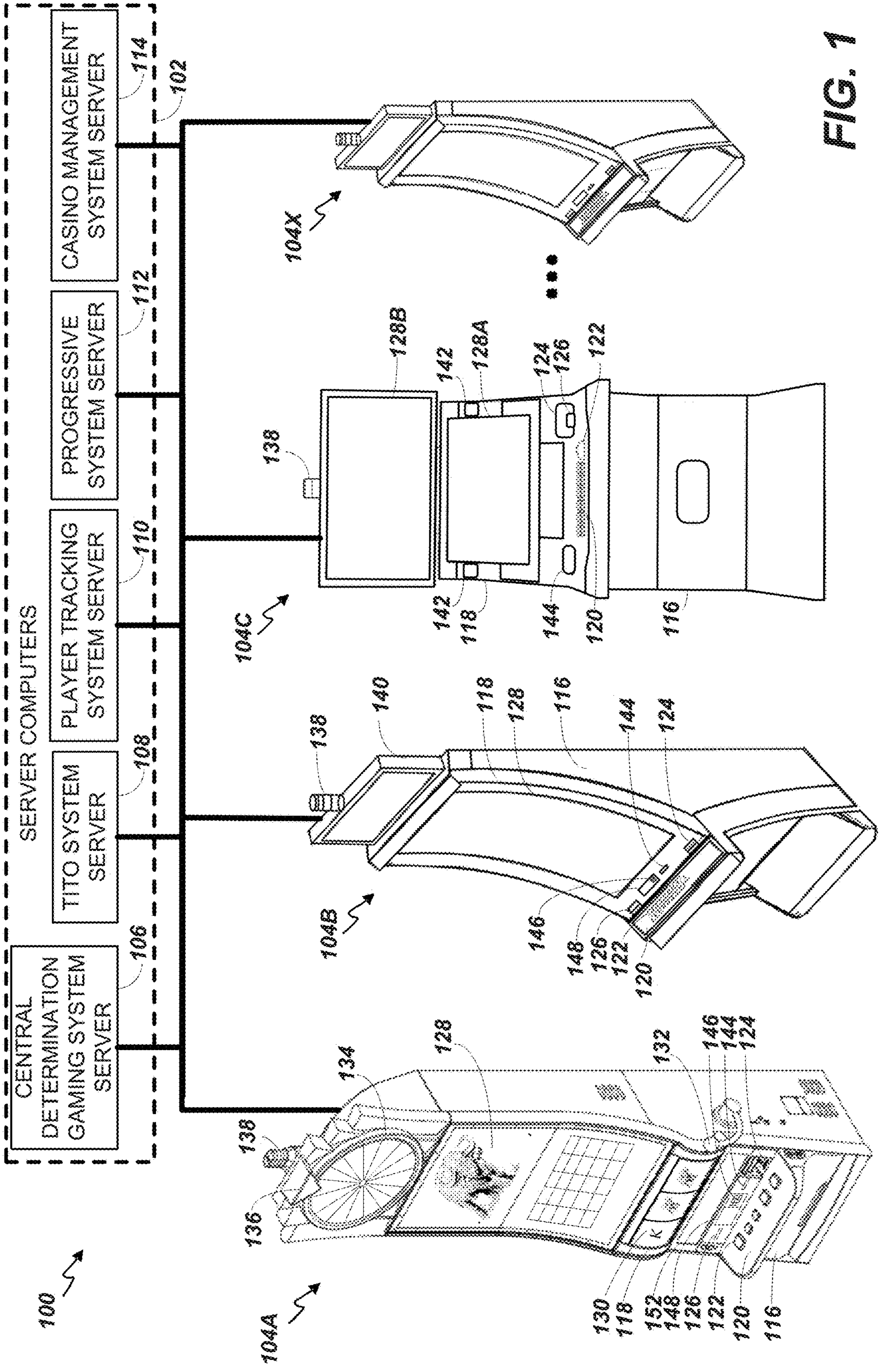
FIG. 1 is an exemplary diagram showing several EGMs networked with various gaming related servers.

The disclosed technology is directed to several features of electronic gaming devices. For example, in one implementation, a method for updating progressive feature prize values across multiple games in a multi-game package, comprising: loading a multi-game package program that includes a first game and at least a second game, wherein the first game is eligible to trigger a payout of one or more first progressive feature prizes associated with the first game, and wherein the first game is ineligible to trigger a payout of one or more second progressive feature prizes associated with the second game; initiating a round of play in the first game of the multi-game package; generating a first set of random-based game outcomes for the round of play using a random number generator (RNG); determining, based on a characteristic of the first set of random based game outcomes, to perform a bulk progressive feature prize update operation across at least one progressive feature prize of each of the games in the multi-game package; adjusting a visual meter associated with each updated progressive feature prize across each of the games in the multi-game package, in accordance with each updated progressive feature prize's respective update operation; generating a second set of random-based game outcomes for the round of play using the RNG; and determining, based on a characteristic of the second set of random based game outcomes, whether one of the one or more first progressive feature prizes in the first game is triggered.

In some such implementations, the first set of random based game outcomes may comprise determinations of particular symbols to display to a player in a slot-based casino game, wherein certain numbers or combinations of such symbols (e.g., "wild" or "special" symbols) may be indicative of a condition in which the respective game will determine to perform one of the aforementioned bulk progressive feature prize update operations across at least one progressive feature prize of each of the games in the multi-game package. In other such implementations, each game in a multi-game package may actually only be eligible to trigger a payout of its own progressive feature prize—and be ineligible to trigger a payout of any of the progressive feature prizes associated with any of the other games in the multi-game package.

In some implementations, the value of the progressive feature prize update operation for each of the games in the multi-game package may be variable and may comprise, e.g., a determined number of free games for a user to play in a given game, a determined amount by which to increment a jackpot prize in a given game, an award of a one-time bonus prize to a player, or any other desired prize of value.

In other implementations, a third set of random-based game outcomes may be generated for the round of play using the RNG, and then, based on a characteristic of the third set of random based game outcomes, the value of the progressive feature prize update operations may be determined for each of the games in the multi-game package.

In still other implementations, a fourth set of random-based game outcomes may be generated for the round of play using the RNG, and then, based on a characteristic of the fourth set of random based game outcomes, it may be determined which of the progressive feature prizes of each of the games in the multi-game package to update as part of the bulk progressive feature prize update operation. For example, in some such implementations, the same type of progressive feature prize may be updated for each of the games in the multi-game package, while, in other implementations, a different type of progressive feature prize may be updated in each of at least two of the games in the multi-game package.

In yet other implementations, adjusting the visual meter associated with each updated progressive feature prize across each of the games in the multi-game package, in accordance with its respective progressive feature prize update operation may further comprise: visually filling in a percentage of the visual meter associated with each updated progressive feature prize across each of the games in the multi-game package based, at least in part, on how close each visual meter is to a respective "soft ceiling" amount (i.e., the "soft ceiling," as used herein, may be defined as an amount over which a progressive feature prize does not automatically trigger, but is indicative of a status wherein, the next time the game associated with such progressive feature prize is played and the progressive feature prize that has exceeded its respective soft ceiling is incremented, the player will have a maximum predetermined chance, e.g., 5%, 25%, 50%, etc., of triggering the award of the respective progressive feature prize). In some such implementations, an additional visual indicator may be applied to the visual meter associated with each progressive feature prize across each of the games in the multi-game package that has met or exceeded its respective soft ceiling amount, thereby informing a player of a progressive feature prize in a particular game that is likely soon to be awarded, i.e., the next time the game associated with said progressive feature prize is played by the player. It is to be understood that the various technological features summarized above and described herein may also be applied analogously in a single-game program (i.e., rather than in a multi-game package), wherein only the progressive feature prizes of the single game are randomly-updated and triggered based on various symbol-driven gameplay outcomes in the single game.

These innovations can be implemented as part of a method, as part of an electronic gaming device, such as an EGM or mobile device, or on an electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

I.B. General Considerations.

The detailed description presents innovations in electronic gaming machines ("EGMs") and other electronic gaming devices. Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present disclosure is defined by the appended claims.

The innovations described herein may, among other things, generate random-based game outcomes for games in a multi-game package. In one or more implementations, a gaming device is loaded with a multi-game package that provides a lobby that presents a set of two or more games (e.g., games A, B, and C, in one example). Within the lobby, the player can utilize the gaming device to select a game to play from the set of games. The lobby may also present game-specific progressive feature prizes, such as jackpots (e.g., "major" jackpots, "minor" jackpots, "mini" jackpots, etc.), where each game may have its own one or more specific progressive feature prizes (e.g., jackpots) that are not linked to multiple games, as well as one or more multi-game jackpots (e.g., a "grand" jackpot) that may be shared across the games and/or multiple game devices. After a gaming device receives a player input to select one of the games, the gaming device generates one or more game play windows for the selected game. The gaming device then initiates a round of play (also referred throughout the disclosure as a "game instance"), which may include generating a first set of random-based game outcomes.

The gaming device may then determine, based on a characteristic of the first set of random based game outcomes, to perform a "bulk progressive feature prize update"

operation across at least one progressive feature prize of each of the games in the multi-game package. As an example, each game in the multi-game package may be eligible to trigger a specific type of progressive feature prize, e.g., a "major" jackpot that has an initial prize value of $500. In this example, the first game (e.g., game A) may determine, based on the first set of random based game outcomes, to perform a bulk progressive feature prize update by updating the major jackpots across all games (i.e., each of games A, B, and C) in the multi-game package simultaneously, e.g., by incrementing each major jackpot by a randomly-determined amount up to one or more updated progressive feature prize values (e.g., updating the major jackpot of game A to $505.00, updating the major jackpot of game B to $501.25, and updating the major jackpot of game C to $500.75). For a given game instance in a particular game (e.g., game A), a gaming device can award the game-specific progressive feature prize (e.g., major jackpot A) designated for a particular game (e.g., game A), but cannot payout other game-specific progressive feature prizes (e.g., major jackpots B and C) designated to other games (e.g., games B and C) in the multi-game package. To be eligible to trigger and obtain the game-specific progressive feature prizes (e.g., jackpots) in the other games, the gaming device would need to exit the current game (e.g., game A) and enter one of the other games (e.g., games B or C) in the multi-game package.

For each game, the gaming device could also present within a user interface a separate set of progressive feature prize graphical indicators for each game. For example, if a multi-game package includes three games, e.g., the aforementioned game A, game B, and game C, then games A, B, and C would each have its own set of one or more progressive feature prize graphical indicators (e.g., jackpot meters 1, 2, and 3, wherein each jackpot meter may reflect the current value of a particular type of a jackpot for a respective game in the multi-game package, such as a major, minor, and mini jackpot). In one or more implementations, a jackpot graphical indicator may represent the result of different ranges of progressive feature prize triggering events that have occurred since the previous triggering of the particular progressive feature prize. For example, in the case of jackpot progressive feature prize, a jackpot meter may grow higher (i.e., filling in more of the jackpot meter) if more rounds of a game in the multi-game package have been played by a player (and, by consequence, more feature prize update operations have taken place) since the last time the particular jackpot has been awarded, indicating to the player a relative likelihood that a particular progressive feature prize has of triggering with the next round of play of the particular progressive feature prize's respective game.

In some implementations, the feature prize update triggering event may occur, for example, based on landing a "special" or "wild" dynamic symbol in a particular combination on one or more reels of a reel set in a slot-based casino game. In such implementations, when the particular combination of "special" or "wild" dynamic symbols for a particular game lands, the gaming device may randomly determine whether to trigger an awarding of a particular progressive feature prize (e.g., a particular type of jackpot) for the game that is being played. If the dynamic symbol combination fails to trigger the awarding of the particular progressive feature prize feature, the gaming device may then perform a bulk progressive feature prize update, e.g., by randomly determining a particular type of progressive feature prize (e.g., a particular type of jackpot) and a corresponding randomly-determined amount to increment each such determined particular type of progressive feature prize by in each of the games in the multi-game package. In some implementations, each time there is a bulk progressive feature prize update, the same types of jackpots may be updated for each game in the multi-game package. In other implementations, different types of jackpots may be updated for each game in the multi-game package each time there is a bulk progressive feature prize update operation performed. As the gaming device continues with its rounds of play in the games, the current states for each of the progressive feature prizes in each of the different games in the multi-game package could vary, which could thereby incentivize players to switch games and/or try out new games in the multi-game package, based on an understanding that at least one of the progressive feature prizes of such other games in the multi-game package may be more likely to be awarded soon to whomever next plays such game.

In one or more implementations, each progressive feature prize for each game in the multi-game package may be visually represented, e.g., in the form of a visual meter (such as a thermometer, bucket, bar graph, growing line, etc.) that may be visually filled up by a percentage, wherein the percentage of filling corresponds to how likely each progressive feature prize is to be awarded to the player upon the next triggering of such progressive feature prize. In some cases, because a player is ineligible to be awarded progressive feature prizes in a game that they are not playing, the concept of "soft ceilings" may be utilized, wherein, when a particular progressive feature prize has been incremented to at or above its soft ceiling level (e.g., $750 for a jackpot that starts out at $500), it may still continue to be incremented via bulk progressive feature prize update operations, but the next time the game associated with such progressive feature prize is played and the progressive feature prize that has exceeded its respective soft ceiling is incremented, the player will have a maximum predetermined chance, e.g., 5%, 25%, 50%, etc., of triggering the award of the respective progressive feature prize. In some implementations, an additional visual indicator may even be applied to the visual meter associated with each progressive feature prize across each of the games in the multi-game package that has met or exceeded its respective soft ceiling amount, e.g., a glowing, pulsating, or highlighting effect, etc.

In terms of a technical problem being solved by the techniques disclosed herein, multiple progressive feature prizes (e.g., jackpots) are able to be dynamically incremented across games, while still satisfying regulatory requirements of achieving a target RTP. According to some embodiments, progressive feature prizes (e.g., jackpots) may be allocated a certain percentage of the target RTP for a particular game. In order to easily track/compute the amount of allocated RTP, conventional progressive jackpots are structured to increment based on a certain percentage of "coin in" (i.e., the amount of bets/wagers placed by the player). The percentage could be a static percentage or a varied percentage. In the case of a varied percentage, typically, the percentage of "coin in" to fund the jackpot is higher when the jackpot values are lower. This allows jackpots that have been reset to a lower value to quickly grow to a certain "target value." Once the jackpot grows to the target value, the contribution percentage may drop, thereby causing the jackpot to grow at a slower rate. In each game applying a "coin in"-based contribution model, the exact contribution amount is known, in order to ensure that the game satisfies the RTP requirement.

The game mechanics presented herein regarding performing bulk progressive feature prize update operations across a single game and/or multiple games in a multi-game package may complicate each game's compliance with RTP, since the rate the progressive feature prize (e.g., in the form of a jackpot) grows is decided in a random environment. In other words, the rate that the progressive feature prize grows will be random and no longer based directly on measurable coin-in value. Thus, to account for the random environment, certain game process controls are needed to ensure that each game (and the multi-game package program as a whole) complies with RTP requirements. To this end, various novel game process controls are disclosed herein, including the discussion related to Tables 1-4 and the implementation of a so-called "soft ceiling" feature to control the triggering of the progressive feature prizes in games that are not currently being played by a player. As may now be better understood, this technical problem of satisfying RTP requirements may be compounded in multi-game environments, wherein a single game's outcomes can simultaneously drive incrementation of a type of progressive feature prize (e.g., a major jackpot) on multiple other games that a player is not even currently playing.

In terms of technical effects, the multi-play and/or multi-game package environment described throughout the disclosure delivers improvements to electronic gaming software, UI design, and/or gaming devices by providing new and/or improved gaming device operations that comply with gaming regulations. Regarding UI-focused operations, presenting the multi-play and/or multi-game package environment can improve the usability of the gaming devices, enhance a player's understandability of obtaining certain game outcomes, and provide another approach to presenting how a player could build equity across multiple games in a multi-game package while complying with gaming regulations. With respect to executing new and/or improved gaming device operations, a gaming device may be specially-programmed to manage multiple jackpot graphical indicators across each of multiple games and link game-specific jackpots to multiple games in a manner that complies with gaming regulations. For example, to implement the multi-game package environment, the specially-programmed gaming device is setup to simultaneously manage, track, and/or adjust a variety of game-specific progressive feature prizes (e.g., jackpots and jackpot graphical indicators) based on the outcomes of rounds of play in a certain game. Additionally, or alternatively, to provide a targeted degree of game volatility, the gaming device can also be specially-programmed to utilize different reel strip patterns and or symbols that determine when bulk progressive feature prize update operations should happen and, when they do, which types of progressive features prizes should be updated in each game (and by what amounts). These and other technical features are described in greater detail later in the disclosure.

II. Example Electronic Gaming Servers and Electronic Gaming Machines or Devices FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple electronic gaming devices connected to networks implemented with one or more of the different server computers 102 described herein.

II.A. Example Server Computers

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

II.B. Example Gaming Devices

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor)

mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
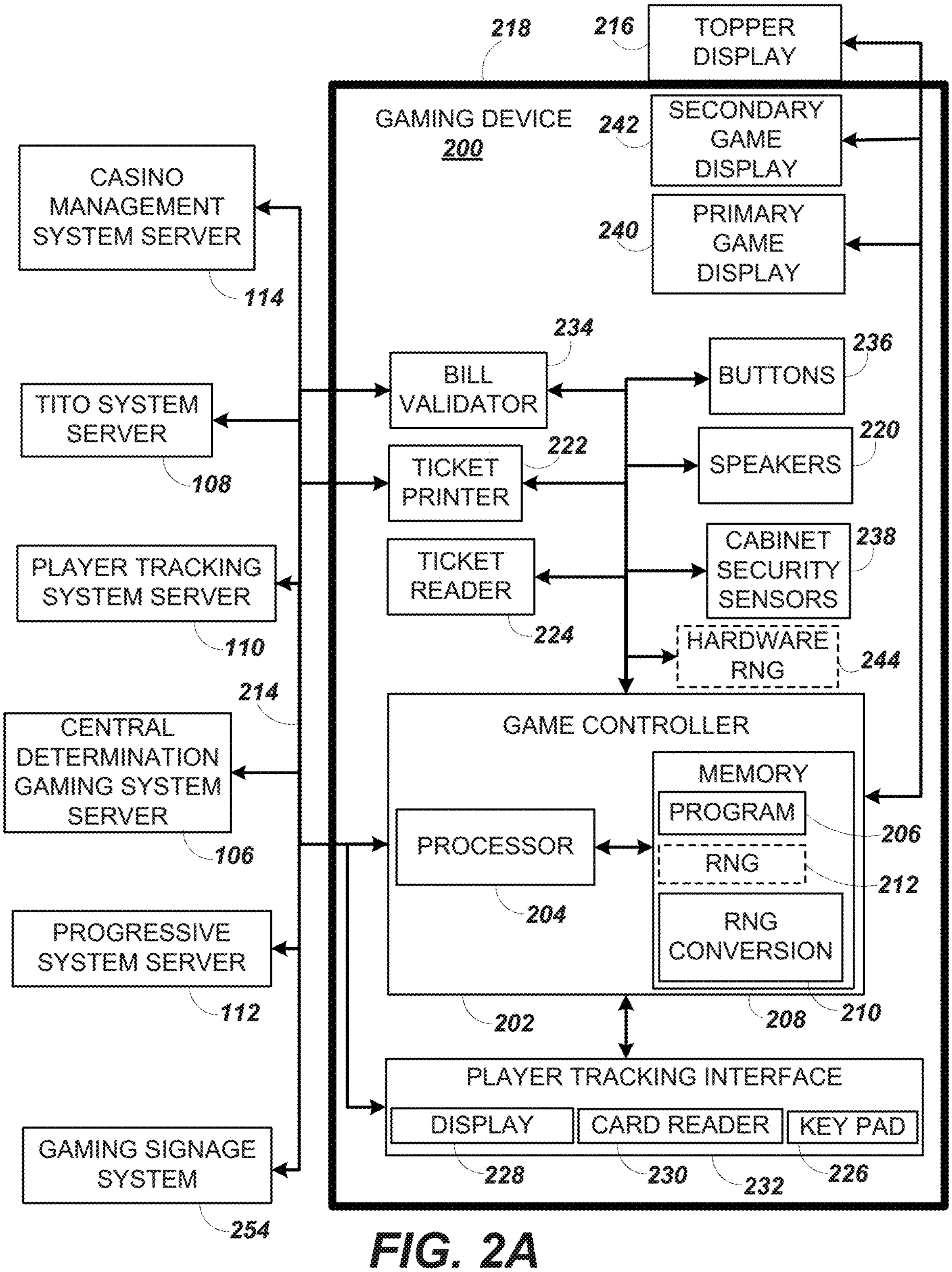
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

II.C. Example Components of Gaming Devices

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

II.D. Example Gaming Environment

Figure 2B:
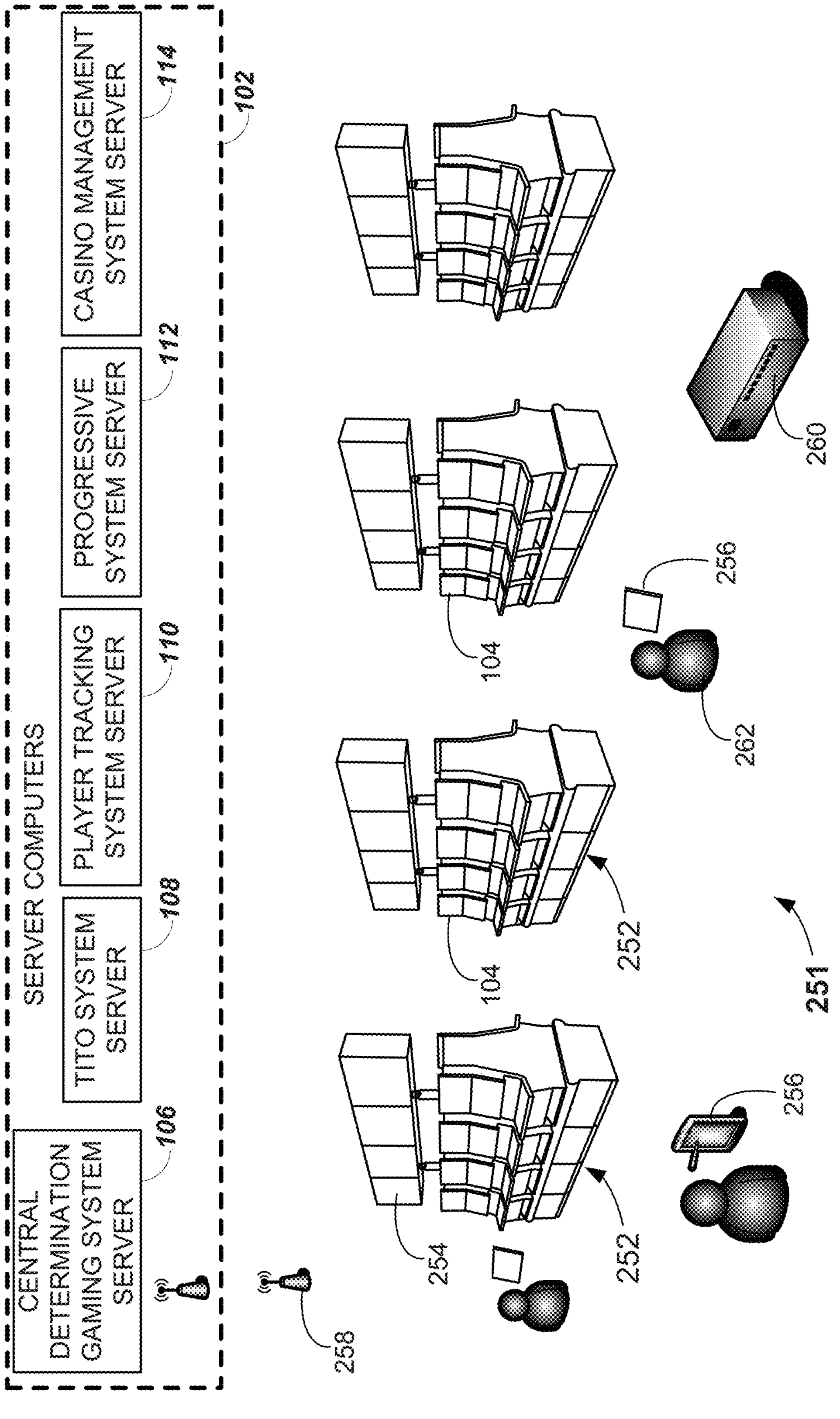
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

II.E. Example Distributed Gaming Delivery

Figure 2C:
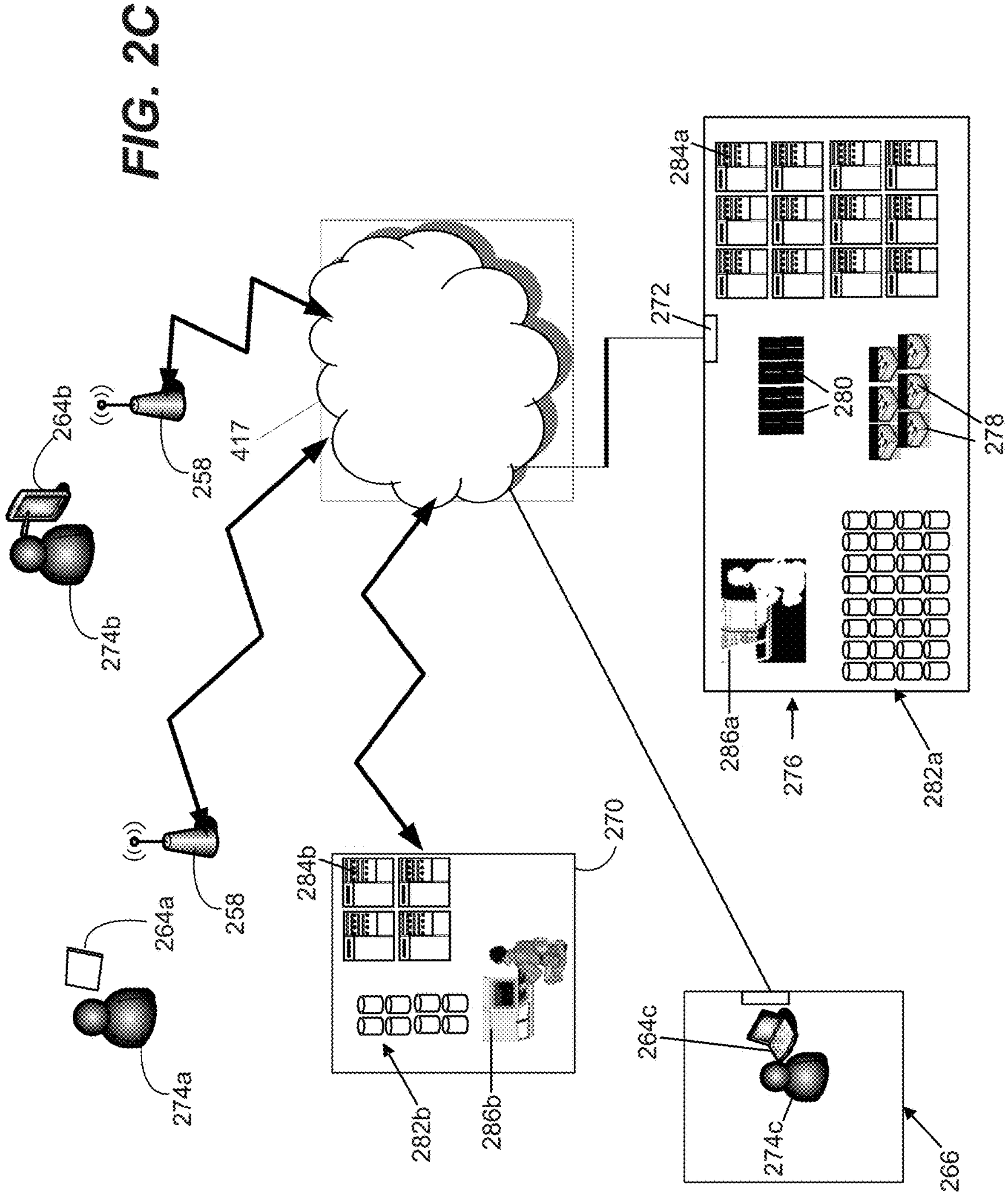
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272, including and one or more workstations 286*a*. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

II.F. Example Game Processing Architecture

Figure 3:
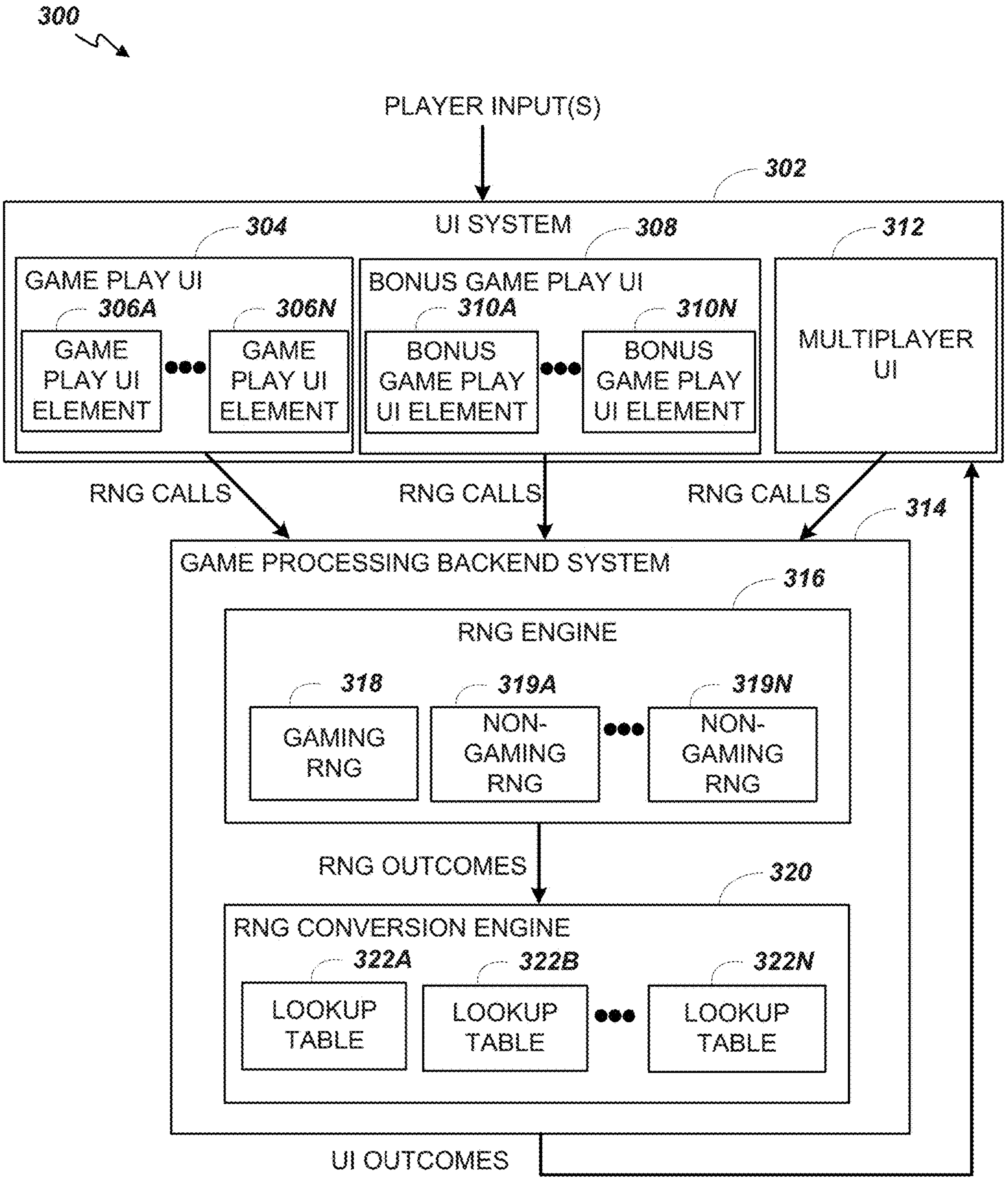
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

III. Bulk Updating Progressive Feature Prize Values Across Games in a Multi-Game Package A multi-game package loaded on a gaming device is configured to present and implement multiple games for the gaming device. Rather than programming each game of the multi-game package to be self-contained and isolated from other games, the multi-game package is set up to share and/or link one or more designated game attributes, such as game-specific jackpots or other progressive feature prizes, across multiples games. For the purposes of this disclosure, the term "game-specific jackpot" refers to a prize and/or payout that a gaming device (e.g., EGM or game server) triggers and distributes based on rounds of play in one or more eligible, designated games. In other words, the gaming device is unable to trigger a game-specific jackpot designated for one or more games when the gaming device initiates and executes game instances in an ineligible, non-designated game. For example, a multi-game package could include games A and B, where game-specific jackpot A is designated to be triggerable in game A and game-specific jackpot B is designated to be triggerable in game B. When the gaming device executes game A, the gaming device is eligible to trigger game-specific jackpot A, but is ineligible and unable to trigger game-specific jackpot B. To trigger game-specific jackpot B, the gaming device would need to exit game A and enter and execute game instances in game B to become eligible.

Examples of game-specific jackpots include progressive jackpots (e.g., stand-alone progressive (SAP) jackpots), mystery jackpots, and must-hit-by jackpots. Within this disclosure, an "SAP jackpot" refers to a prize and/or payout that adjusts (e.g., increments or decrements) based on wagers placed and/or particular symbols landed on a specific gaming device. In a multi-game package context, one or more games in the multi-game package context could be linked to a given SAP jackpot. SAP jackpots differ from other types of progressive jackpots, such as local progressive or wide area network progressives, in that wagers on other gaming devices are not pooled or linked together to form and contribute to the progressive jackpot. For purpose of this disclosure, the term "prize" is not limited to cash awards or awards in the form of hard currencies (e.g., United States dollar, Australian dollar, Macau pataca), but can also include other types of awards, such as free games/spins, loyalty program awards, vouchers for promotional credits, entertainment, and/or eateries, other marketing-based awards, game-based or virtual awards (e.g., loot boxes and online virtual credits), and digital currencies-based awards (e.g., Bitcoin, Ether, etc.).

In one or more implementations, to link a game attribute across multiple games in a multi-game package, a gaming device can simultaneously fund multiple game-specific jackpots linked to multiple games. Specifically, a gaming device may fund random amounts of values to a set of game-specific jackpots each time a characteristic of the results of a round of play in a given game correspond to a condition wherein a bulk progressive feature prize update operation is to be performed by the gaming device (e.g., landing a certain number or combinations of "wild" or "special" symbols on a spin in the round of play). In certain implementations, the gaming device does not fund one or more types of jackpots that the gaming device can trigger in the given game. Continuing with the example above, assume that game A includes multiple types of jackpots, such as a major jackpot A, minor jackpot A, and mini jackpot A, and game B also includes multiple types of jackpots, such as major jackpot B, minor jackpot B, and mini jackpot B. If the gaming device executes game instances in game A, the gaming device may simultaneously fund game-specific jackpots during a bulk progressive feature prize update, e.g., major jackpot A and major jackpot B, but does not mini jackpots A and B or minor jackpots A and B. Although the gaming device may fund a game-specific jackpot of game B (e.g., major jackpot B) when executing game instances in game A, the gaming device would be ineligible to trigger a distribution or payout of game-specific major jackpot B since that jackpot is designated for game B, rather than game A.

Having the gaming device simultaneously fund multiple game-specific jackpots across multiple games provides technical improvements to the gaming device. Specifically, by simultaneously funding multiple game-specific jackpots, the gaming device performs a new and/or improved function that allows a gaming device to enforce a policy where certain games are eligible to trigger certain game-specific jackpots while concurrently building game equity across multiple games. A gaming device can later access other games to become eligible for obtaining the game equity built in the other games. By doing so, the gaming device can comply with certain gaming regulations and prevent having only a subset of the games in the multi-game package to be played. In one example not practicing the techniques disclosed herein, a multi-game package could be configured to fund a major jackpot A for game A when game instances execute in game A. In this example, when executing game instances in game A, the gaming device would not fund jackpots in other games in the multi-game package, such major jackpots B and C, that are designated for other games B and C, respectively. By doing so, unless rounds of play occur in games B and C, the major jackpots for B and C could remain relatively low (or at their initial values) causing game A to be played majority of the time. Conversely, if the multi-game package is configured to concurrently and randomly fund various types of jackpots in games A, B, and C, e.g., when the results of executing game instances in game A indicate that a bulk progressive feature prize operation should be performed, then the various types of jackpots in games B and C (e.g., major, minor, or mini jackpots) may continue to grow and will not stay stagnant—even when the gamine device does not execute game instances in games B and C. Having game equity that simultaneously accumulates for all three games could cause players to select the other games B and C for game play—even after a game device triggers a payout of a jackpot in game A, e.g., major jackpot A. For the purposes of this disclosure, the term "game equity" generally refers to a potential or perceived value that accumulates as rounds of play progress and various bulk progressive feature prize update operations are performed based on the results of game instances of games in the multi-game package.

For a multi-game package, the gaming device can simultaneously fund multiple game-specific jackpots across multiple games using a predetermined or random funding rate. In one implementation, to implement a predetermined funding rate, the gaming device can contribute a per-jackpot type predetermined value to each game-specific jackpot that is updated during a bulk progressive feature prize update operation (e.g., a $1 update each time a mini jackpot is bulk updated, a $5 update each time a minor jackpot is bulk updated, and a $10 update each time a major jackpot is bulk updated). The predetermined funding rate may not change from each round of play in a game and/or when switching from one game to another game. In another implementation, the gaming device could randomly contribute varying amounts to the various types of game-specific jackpots based on one or more game parameters, such as spin count, current prize value of a given game-specific jackpot, and/or jackpot meter fill level states and/or the results of an RNG generating a random-based outcome determining the amount of the progressive feature prize update. Stated another way, the bulk progressive feature prize update amount could dynamically or randomly change by monitoring and/or accounting for at least one game parameter and/or the results of an RNG generating a random number that corresponds (e.g., via a weighted lookup table) to a particular update amount. In both examples, to comply with gaming regulations, the gaming device would still need to be configured to generate a target or controllable RTP for each type of game-specific jackpot for each game in the multi-game package. Other implementations could also provide fixed or random update amounts after completing a certain number of rounds of play. For example, instead of contributing to multiple game-specific jackpots based on the results of rounds of play (e.g., the landing of particular “wild” or “special” symbols), the gaming device could wait and contribute to the multiple game-specific jackpots every two, three, or four rounds of play etc.

With reference to FIG. 3, to share and/or link one or more designated game attributes (e.g., game-specific progressive jackpots or other prizes) across multiples games, the UI system 302 could present a lobby that allows a player to select a game from a set of games included in the multi-game package. As part of the lobby, the UI system 302 could present one or more designated game attributes that are linked across multiple games but that are only eligible to be triggered in a subset of the games. After a player selects a game, the UI system 302 presents the game play UI 304 to the player. Within the game play UI 304, the player could use the gaming device to set a wagering amount and initiate a round of play—thereby, causing the game play UI 304 to present to a player one or more random based game outcomes. In a slot game context, a round of play corresponds to spinning one or more sets of reels within one or more game play windows. The game play UI 304 would also present a player with changes in the designated game attributes when initiating and/or completing a round of play. For example, using game-specific jackpots as the designated game attributes, the game play UI 304 could present a simultaneous incrementation of multiple game-specific jackpots after a player presses a spin button on a gaming device and lands a specified number and/or combination of “wild” or “special” symbols (or other combination of slot results that are configured to trigger a bulk progressive feature prize update operation in a given game).

Figure 4A:
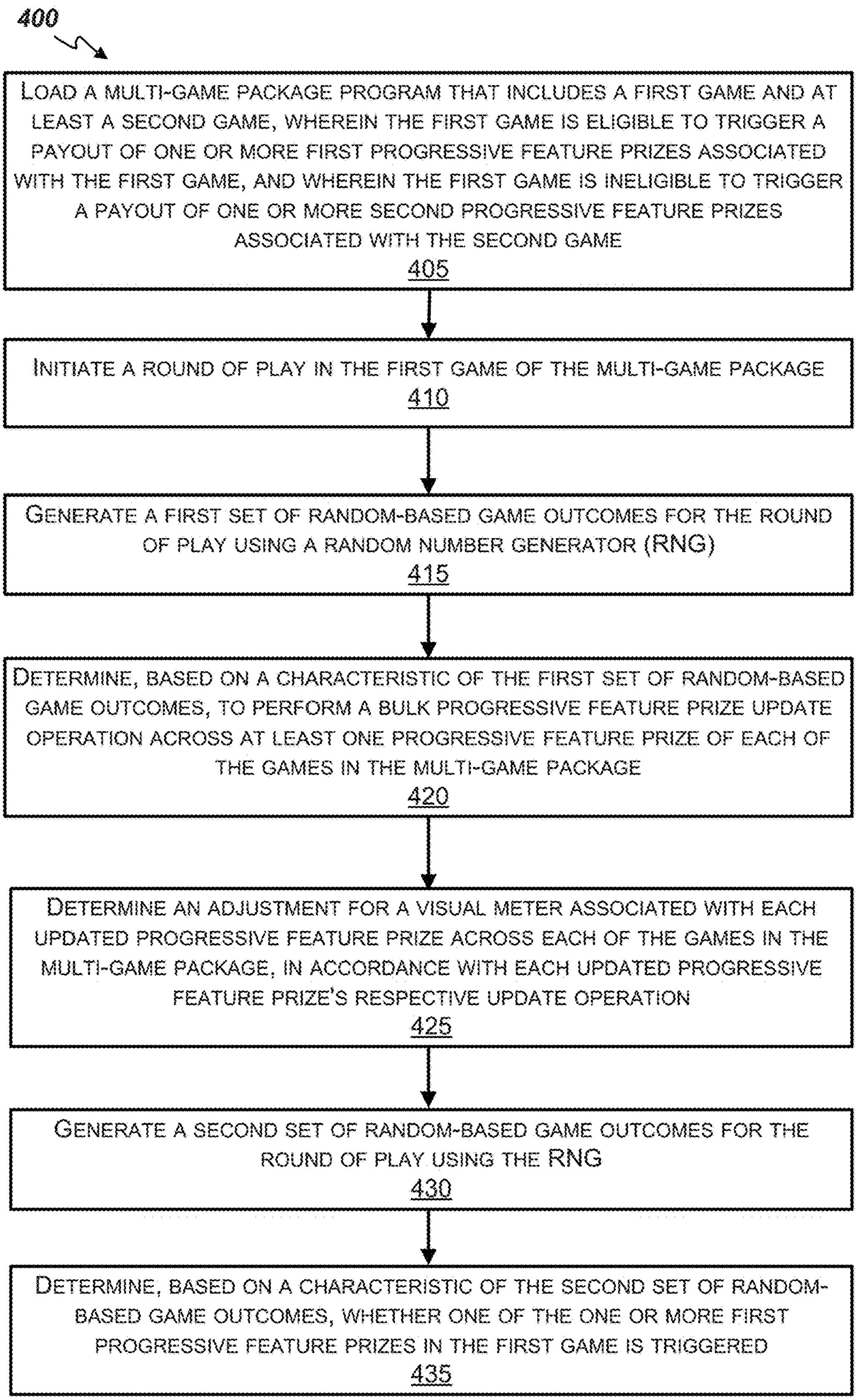
FIGS. 4A-4C are flowcharts illustrating example techniques for performing an embodiment of the disclosed technology.
Figure 4B:
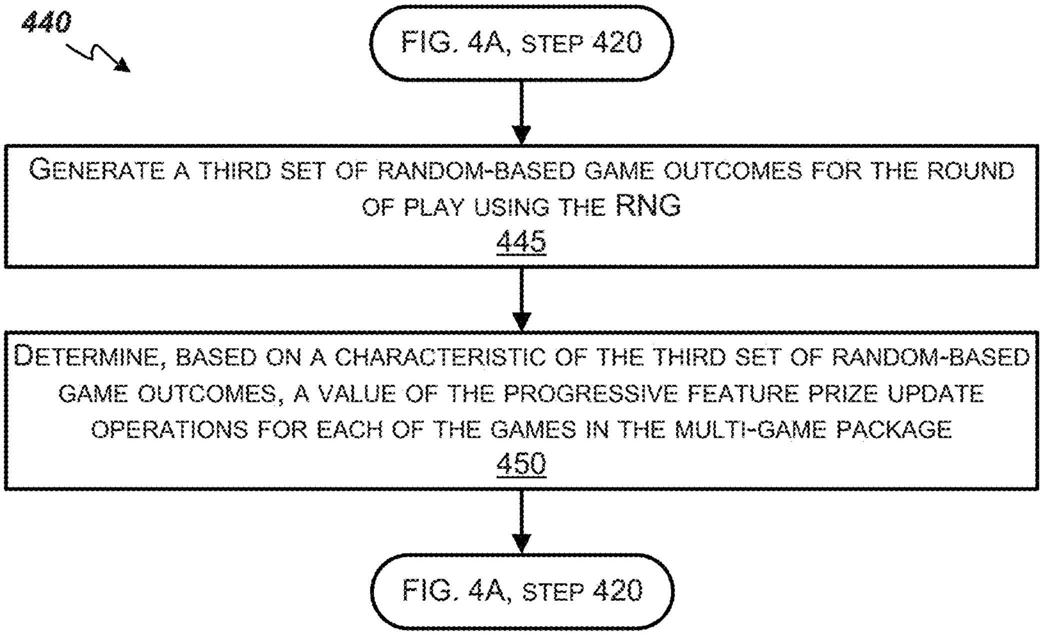
Figure 4C:
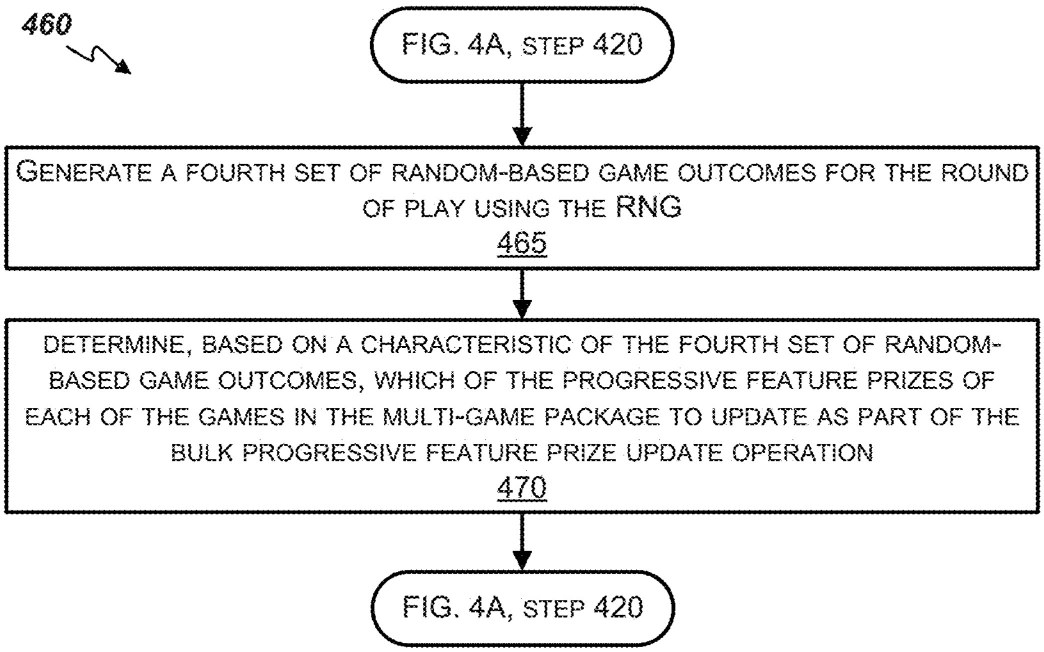

Turning now to FIG. 4A, a flowchart is depicted, illustrating operation 400 for performing bulk progressive feature prize update operations across game-specific prizes (e.g., jackpots) linked across multiple games in a multi-game package. In one implementation, the operation 400 may be implemented by a UI system 302 shown in FIG. 3 and/or displayed on the primary game display 240 and secondary game display 242 of a gaming device 200 shown in FIG. 2A. The operation 400 may also correspond to and be carried out via the lobby UI 500 shown in FIG. 5, and the game play UIs 600 and 700 shown in FIGS. 6A-6C and 7. The use and discussion of FIGS. 4A-4C is only an example to facilitate explanation and is not intended to limit the disclosure to this specific example. For example, operation 400 does not necessarily need to perform the sequence of blocks in the order as depicted in FIG. 4A. Specifically, operation 400 may implement blocks 430 and 435 before block 425, if so desired. Additionally, or alternatively, one or more of the blocks may be optional and may not be performed in all implementations of operation 400. Although the operation 400 is mainly directed to game-specific progressive features prizes such as jackpots, the operation 400 described in FIG. 4A can also be utilized for other types of game attributes linked to multi-games.

Operation 400 may start at block 402 by loading a multi-game package program that includes a first game and at least a second game, wherein the first game is eligible to trigger a payout of one or more first progressive feature prizes associated with the first game, and wherein the first game is ineligible to trigger a payout of one or more second progressive feature prizes associated with the second game. As described above, in some implementations, the converse may also be true, i.e., the second game is eligible to trigger a payout of one or more second progressive feature prizes associated with the second game, but the second game is ineligible to trigger a payout of the one or more first progressive feature prizes associated with the first game. In multi-game packages with more than two games, according to some implementations, each game may only be eligible trigger a payout of one or more progressive feature prizes associated with itself—while still being able to perform bulk progressive features prize update operations on the other games in the multi-game package, as described throughout this disclosure.

Next, at block 410, operation 400 may initiate a round of play in the first game of the multi-game package. At block 415, operation 400 may generate a first set of random-based game outcomes for the round of play using a random number generator (RNG). In some implementations, the first set of random-based game outcomes may be used to determine whether the player lands one or more “special” or “wild” symbols in a game instance of a slot-based game, wherein a particular number and/or combination of such “special” or “wild” symbols may cause the operation 400 to, at block 420, determine, based on a characteristic of the first set of random-based game outcomes, to perform a bulk progressive feature prize update operation across at least one progressive feature prize of each of the games in the multi-game package.

In some implementations, a weighted table may be used to randomly determine whether a given slot reel lands on a predetermined “special” or “wild” symbol for the current instance or round of game play in a given game. For example, for a given game instance, one or more reel strips may include one or more dynamic symbols (e.g, a “special” symbol). At the start of a spin, the game will determine, for each dynamic symbol on the reel strips, whether the dynamic symbol should be replaced with a “regular” symbol or a “special” symbol (e.g., a symbol indicating that a jackpot update operation may be triggered across one or more games in the multi-game package) using a weighted table. Table 1, below, is an example of such a weighted table.

TABLE 1

| SYMBOL TYPE | WEIGHT |
| --- | --- |
| “SPECIAL” SYMBOL | 100 |
| “REGULAR” SYMBOL | 1000 |
| TOTAL WEIGHT | 1100 |

In some implementations, as will be explained in further detail below with reference to operation 460 of FIG. 4C, block 420 may further comprise the game running another RNG operation to determine which jackpots (or types of jackpot) to increment across each game in the multi-game package (e.g., a mini jackpot, a minor jackpot, a major jackpot, or a grand jackpot). Table 2, below, is an example of such a weighted table.

TABLE 2

| PRIZE TYPE | WEIGHT |
|---|---|
| MINI JACKPOT | 1000 |
| MINOR JACKPOT | 200 |
| MAJOR JACKPOT | 40 |
| GRAND JACKPOT | 1 |
| TOTAL WEIGHT | 1241 |

As may now be understood, according to Table 2, the most likely type of jackpot to be updated for each game in the multi-game package during a bulk progressive feature prize update operation would be the mini jackpot, followed by the minor jackpot, then the major jackpot, and then the grand jackpot being the least likely jackpot to be updated (with only a 1 in 1241 chance of being updated in any given bulk update operation). In some implementation, the same type of progressive feature prize (e.g., jackpot) may be updated in each game in a multi-game package during a bulk progressive feature prized update operation, while, in other implementations, the type of progressive feature prize (e.g., jackpot) to be updated in each game in a multi-game package during a bulk progressive feature prize update operation may be randomly and/or individually determined for each such game in the multi-game package.

In some implementations, as will be explained in further detail below with reference to operation 440 of FIG. 4B, block 420 may further comprise, after determining which jackpot to increment, randomly determining the amount by which to increment for the selected jackpot for each game in the multi-game package. In some implementations, the weights associated with the increment amount could vary based on the type of selected jackpot. As an example, different weights would be used to determine that a jackpot increment of $5 should be applied to a minor jackpot versus a major jackpot. Table 3, below, provides an example of the distribution weights that could be used in a particular implementation. As may now be appreciated, when a combination of “special” or “wild” symbols land in a given game instance that triggers a bulk progressive feature prize update operation to occur, the game can use a weighted table, such as Table 3, below, to increment the game-specific jackpots across all games by the same “credit” amount (wherein the credit could correspond to actual currency value, value in terms of an amount of additional free games for the player to play, or the other forms of prizes discussed herein that can be returned to a player). Alternatively, the game can run separate RNG pulls from Table 2, above, to independently determine the amount to increment for the corresponding game-specific jackpots. As an example, the game could determine that the progressive feature prize to be updated in a given bulk update operation is the major jackpot. The game then determines how much to increment the major jackpots. To do so, the game may perform a single RNG pull to determine one value (e.g., $5) to increment across the major jackpots of all of the games in a multi-game package. Alternatively, the game may perform separate RNG pulls to increment the major jackpots by different amounts (e.g., a $1 increment for the major jackpot of Game A, a $2 increment for the major jackpot of Game B, and a $5 increment for the major jackpot of Game C). According to some implementations, the amount to bulk increment a jackpot prize by (and which jackpot prize is selected to increment) may be further based, at least in part, on a game volatility target and the target RTP for a given game.

TABLE 3

| INCREMENT | WEIGHTS | | |
|---|---|---|---|
| AMOUNT (CREDITS) | MINI | MINOR | MAJOR |
| 5000 | 1 | 1 | 25 |
| 2500 | 2 | 2 | 120 |
| 1000 | 5 | 20 | 260 |
| 500 | 10 | 20 | 120 |
| 250 | 20 | 40 | 40 |
| 200 | 25 | 50 | 20 |
| 150 | 40 | 90 | 40 |
| 100 | 50 | 240 | 20 |
| 75 | 90 | 90 | 10 |
| 50 | 210 | 40 | 5 |
| 25 | 80 | 10 | 2 |
| 10 | 50 | 5 | 1 |
| 5 | 20 | 2 | 1 |

As will be explained in further detail below, according to some embodiments, each of the bulk progressive feature prize update operations performed in the games of the multi-game package may be configured to comply with return to player (RTP) requirements for each respective game, at least in part, via use of a soft ceiling amount for the respective game’s progressive feature prizes. As explained below, the use of a soft ceiling amount will ensure that, although the game may be unable to trigger the award of progressive feature prizes in games that the player is not currently playing, the introduction of a soft ceiling concept may be used to ensure that is sufficiently likely that the player will trigger the award of such progressive feature prize the next time (or within the next handful of times) that the player is playing such other game and the progressive feature prize that has exceeded its soft ceiling amount is randomly updated/incremented.

At block 425, operation 400 may determine an adjustment for a visual meter associated with each updated progressive feature prize across each of the games in the multi-game package, in accordance with each updated progressive feature prize’s respective update operation. As mentioned above, in one or more implementations, each progressive feature prize for each game in the multi-game package may be visually represented, e.g., in the form of a visual meter (such as a thermometer, bucket, bar graph, growing line, etc.) that may be visually filled up by a percentage, wherein the percentage of filling corresponds to how likely each progressive feature prize is to be awarded to the player upon the next triggering of such progressive feature prize.

In some implementations, a given game can use a static range to determine the fill percentage for a particular type of jackpot meter for a given game instance. Table 4, below, shows a set of exemplary static values that may be used for each game-specific jackpot in a given game. In this example, the game does not perform a bulk increment operation on the “grand jackpot,” but that is purely a game design choice. As shown in Table 4, the mini jackpot will start out at $10 and appear 99% “filled” after the meter value exceeds $50, the minor jackpot will start out at $100 and appear 99% filled after the meter value exceeds $200, and the major jackpot will start out at $500 and appear 99% filled after the meter value exceeds $2,000. Based on Table 4, the game may set the initial jackpot meter amount for each type of jackpot, as well as the ceiling amount (or “soft ceiling” amount, i.e., in the case of games not currently being played by the player, as will be described in further detail below) for each type of jackpot meter. The values stored in Table 4 will help determine how quickly each respective jackpot meter will visually “fill up” during the bulk progressive feature prize update operations described herein. According to some implementations, the jackpot meters may only "officially" reach 100% fullness once the game has triggered the specific jackpot and awarded it to the player.

TABLE 4

| Meter Filled Bar (X %) | Mini | Minor | Major |
|---|---|---|---|
| 0% (A) | $10.00 | $100.00 | $ 500.00 |
| 99% (B) | $50.00 | $200.00 | $2,000.00 |

At block 430, operation 400 may generate a second set of random-based game outcomes for the round of play using the RNG. Then, at block 435, operation 400 may determine, based on a characteristic of the second set of random based game outcomes, whether one of the one or more first progressive feature prizes in the first game is triggered. For example, in some implementations, as each jackpot meter becomes fuller, the game may increase the chances of randomly triggering the respective jackpot prize. In some such implementations, after performing a bulk update operation on a particular jackpot prize, the game may randomly determine whether or not to award the particular jackpot prize to the player at that time. The trigger equations below are one example of a mathematical model that may be used to determine whether or not to trigger a particular jackpot prize on a particular round of play of a game. Using the trigger equations below, the weights associated with triggering the awarding of a jackpot increase as the jackpot's meter fills up. For example, at 99% filled, the jackpot has about a 20% chance of triggering (i.e., as indicated by the divide by 5 operation in the trigger equation table, below), while, if the jackpot meter was currently at 49% filled, the jackpot would have only about a 10% chance of triggering on that particular round of play of the game.

$$\text{if } (C<B)\ X=(C-A)/(B-A)$$

$$\text{if } (C>=B)\ X=99\%$$

A—Startup ($)
B—Ceiling ($)
C—Current meter amount ($)
X—Meter % filled
*Note X always rounds down to nearest integer $$Y=X*100$$

Trigger Equation Weight (Mini/Minor/Major)

| | |
|---|---|
| TRUE | ((Y + 1) * 10)/5 |
| FALSE | 1000 − ((Y + 1) * 10)/5 |

In some cases, because a player is ineligible to be awarded progressive feature prizes in a game that they are not playing, the concept of "soft ceilings" may be utilized, wherein, when a particular progressive feature prize has been incremented to at or above its soft ceiling level (e.g., a $2,000 soft ceiling for a major jackpot that starts out at $500), it may still continue to be incremented via bulk progressive feature prize update operations (while continuing to remain visually at 99% filled), but, the next time the game associated with such progressive feature prize is played and the progressive feature prize that has exceeded its respective soft ceiling is incremented, the player will have a maximum predetermined chance, e.g., 5%, 20%, 50%, etc., of triggering the award of the respective progressive feature prize. In some implementations, an additional visual indicator may even be applied to the visual meter associated with each progressive feature prize across each of the games in the multi-game package that has met or exceeded its respective soft ceiling amount, e.g., a glowing, pulsating, or highlighting effect, etc., to further draw a player's attention to consider playing the game that has a jackpot meter that has already met or exceeded its soft ceiling amount.

In still other implementations, rather than using a special symbol-driven trigger to determine whether to award a particular progressive feature prize, such as a game-specific jackpot, the game could utilize a "must hit by" jackpot concept for one or more of the game-specific jackpot prizes. For example, the major jackpot value for one of the games may be selected from a value between $4,000 and $5,000 (e.g., $4,550). As the major jackpot value increments for the given game, the amount the jackpot meter is visually filled up by could be based on how much the jackpot value has been incremented in relation to the determined "must hit by" jackpot prize value.

Alternatively, the jackpot meter may be visually filled based on static ranges, as discussed in the example of Table 4, above. The reason why some implementations of a multi-game package, such as those described herein, may not utilize a strict "must hit by" jackpot/prize triggering process is to avoid triggering the jackpot/prize for one game while the player is playing another game in the multi-game package. For example, when playing game A, the jackpot value for one of game B's jackpots may reach the predetermine "must hit by" jackpot prize value (e.g., a major jackpot reaching a value of $4,550). If this occurred, the game would potentially need to award the player game B's Major jackpot—even while the player is playing game A, which would defeat an intended purpose of attempting to expose players to other games in the package that they may not normally play or have familiarity with.

As may now be appreciated, by controlling the parameters of the triggering equations described above, in conjunction with the use of weighting Tables 1-4, a multi-game package system may be able to successfully perform bulk progressive feature prize update operations across multiple games in a multi-game package, while still complying with each game's RTP requirements—even though the rate at which the progressive feature prizes in each game grow may be determined pseudo-randomly or randomly. In other words, through at least the implementation of the soft ceiling feature described above, over the long term, the multi-game package is still able to exert enough control over the frequency (and likelihood) of the triggering of the various progressive feature prizes in each of the games in the multi-game package so that the RTP requirements may be satisfied for each game. In the event that even greater precision or control is needed over the process of awarding of each game's progressive feature prizes, the aforementioned RNGs could generate larger numbers (e.g., numbers ranging from 1 to a million, rather than from 1 to a thousand) to allow for finer-grained control over the percentage chances of which progressive feature prizes are updated, by how much, and how likely they are to be triggered.

Turning now to FIG. 4B, a flowchart 440 is depicted, illustrating additional details related to block 420 of operation 400 for performing bulk progressive feature prize update operations across multiple games in a multi-game package. As described above with reference to the act of determining, for a game in a multi-game package that is currently being played, an amount by which to increment for the selected jackpot for each game in the multi-game package, the operation 440 may, at block 445, generate a third set of random-based game outcomes for the round of play using the RNG. Then, at block 450, the operation 440 may determine, based on a characteristic of the third set of random based game outcomes, a value of the progressive feature prize update operations for each of the games in the multi-game package. As described above, in some implementations, a weight table, such as Table 3, above, may be used to map the results of the RNG pull that is used to generate the third set of random-based game outcomes into amount of credit/value/prize by which to update a particular type of progressive feature prize (e.g., a major, minor, or mini jackpot).

Turning now to FIG. 4C, a flowchart 460 is depicted, illustrating additional details related to block 420 of operation 400 for performing bulk progressive feature prize update operations across multiple games in a multi-game package. As described above with reference to the act of determining, for each game in a multi-game package, which progressive feature prize, e.g., from among two or more types of progressive feature prizes that may be associated with each game in the multi-game package, to increment for a particular bulk update operation, the operation 460 may, at block 465, generate a fourth set of random-based game outcomes for the round of play using the RNG. Then, at block 470, the operation 460 may determine, based on a characteristic of the fourth set of random based game outcomes, which of the progressive feature prizes of each of the games in the multi-game package to update as part of the bulk progressive feature prize update operation. As described above, in some implementations, a weight table, such as Table 2, above, may be used to map the results of the RNG pull that is used to generate the fourth set of random-based game outcomes into a particular type of progressive feature prize (e.g., a major, minor, or mini jackpot) that is to be updated for a given game(s) in a multi-game package.

Figure 5:
FIGS. 5-7 are example screenshots and diagrams showing aspects of the disclosed technology.

FIG. 5 is a diagram that depicts an example general layout of a lobby UI 500 for a multi-game package. A gaming device can present lobby UI 500 shown in FIG. 5 when executing a game program. Using FIG. 2A as an example, when a gaming device 200 executes game program 206, the gaming device 200 displays the lobby UI 500 on primary game display 240 and/or secondary game display 242. Additionally, or alternatively, at least some or all portions of the lobby UI 500 could be presented on mechanical and/or electro-mechanical components not shown in FIG. 2A. The lobby UI 500 corresponds to a UI that a gaming device presents before entering one of the games, after exiting one of the games, and/or when the gaming device is idle and waiting for a player.

As mentioned above, the various technological features and processes described above, e.g., with reference to FIGS. 4A-4C, may also be applied analogously in a single-game program environment (i.e., rather than in a multi-game package), wherein only the progressive feature prizes of a first game are randomly-updated (e.g., at block 420) and triggered (e.g., at block 435) based on various symbol-driven gameplay outcomes in the first game. Similarly, the various progressive feature prizes of the first game may be visually updated in accordance with the progressive feature prize update operations, although, as may be understood, the analogous operations of determining progressive feature prize types and update amounts to make in other games would be omitted in such a single-game program environment.

In FIG. 5, the lobby UI 500 includes a first game $505_1$, a second game $505_2$, and a third game $505_3$. Lobby UI 500 also includes three progressive feature prize meters for each of the games 505 in the multi-game lobby 500. In this case, there is a major jackpot meter ($510_1$), a minor jackpot meter ($510_2$), and a mini jackpot meter ($510_3$) for each game, although it is to be understood that other numbers of progressive feature prizes are possible for each game, and each game may not necessarily need to have an identical set of available progressive feature prize meters. As discussed above, in the example lobby UI 500, whenever a bulk progressive feature prize update operation takes place, each of the progressive feature prize meters may be visually incremented (e.g., filled) by a percentage that reflects how close each progressive feature prize meter in each game is to its respective ceiling (or "soft ceiling," as the case may be) amount. In this way, the meters provide a visual cue to the player as to how likely each respective progressive feature prize is to be triggered the next time its respective game is played and the necessary number and/or combination of "special" or "wild" symbols are landed on the reel strip for a particular round of play.

Figure 6A:
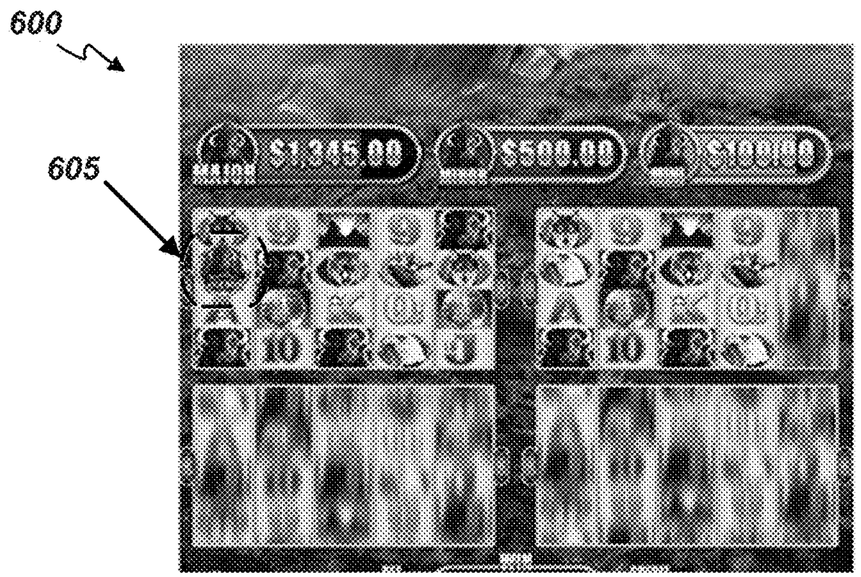
Figure 6B:
Figure 6C:

FIGS. 6A-6C show various diagrams 600/610/620 that depict example UI elements associated with performing progressive feature prize update operations for a game in a multi-game package. A gaming device can present a game UI, such as that shown in diagram 600 of FIG. 6A when executing a game program. Using FIG. 2A as an example, when a gaming device 200 executes game program 206, the gaming device 200 may displays the game UI 600 on primary game display 240 and/or secondary game display 242. Additionally, or alternatively, at least some or all portions of the game UI 600 could be presented on mechanical and/or electro-mechanical components not shown in FIG. 2A.

The game UI 600 in FIG. 6A corresponds to a UI that a gaming device may present when the gaming device has landed a certain number or combinations of "wild" or "special" symbols (e.g., special symbol 605) on a spin in a round of play of a particular game that corresponds to a condition wherein a bulk progressive feature prize update operation is to be performed by the gaming device. In the example game UI 600 of FIG. 6A, it has been randomly determined that the progressive feature prize of the game that is to be updated is the game's "major jackpot," and it has further been randomly determined that the amount by which the major jackpot of the game is to be incremented is $5. Exemplary techniques for determining which progressive feature prize of a game to update (and by what amount) have been described in detail above.

The game UI 610 in FIG. 6B corresponds to a graphical animation that may be displayed on a UI of a gaming device to visually indicate to a player that a particular progressive feature prize, in this case, the game's major jackpot 615, is being updated, i.e., incremented, based on the landing of special symbol 605 on the current spin. Finally, the game UI 620 in FIG. 6C corresponds to a UI that may be displayed by a gaming device to indicate that a particular progressive feature prize, again, in this case, the game's major jackpot, has been updated as a result of the performance of a progressive feature prize update operation. The update may be reflected by the jackpot meter 615 in FIG. 6B showing a value of $1345.00 before the update operation, and the jackpot meter 625 in FIG. 6C showing a value that is increased by $5, i.e., to show a value of $1350.00 after the update operation. As described above, in some implementations, the jackpot meter may also be visually filled to a greater percentage, i.e., in order to reflect the $5 gain in value for the game's major jackpot prize.

As may now be understood, in a multi-game package, a similar graphical animation may also be displayed on a UI of the gaming device to visually indicate to the player that particular progressive feature prizes, e.g., the major jackpots, of some or all of the other games in the multi-game package that are not currently being played are also being updated (i.e., along with major jackpot 615 of the game currently being played) by predetermined or randomly-determined update amounts, as part of a bulk progressive feature prize update operation.

Figure 7:
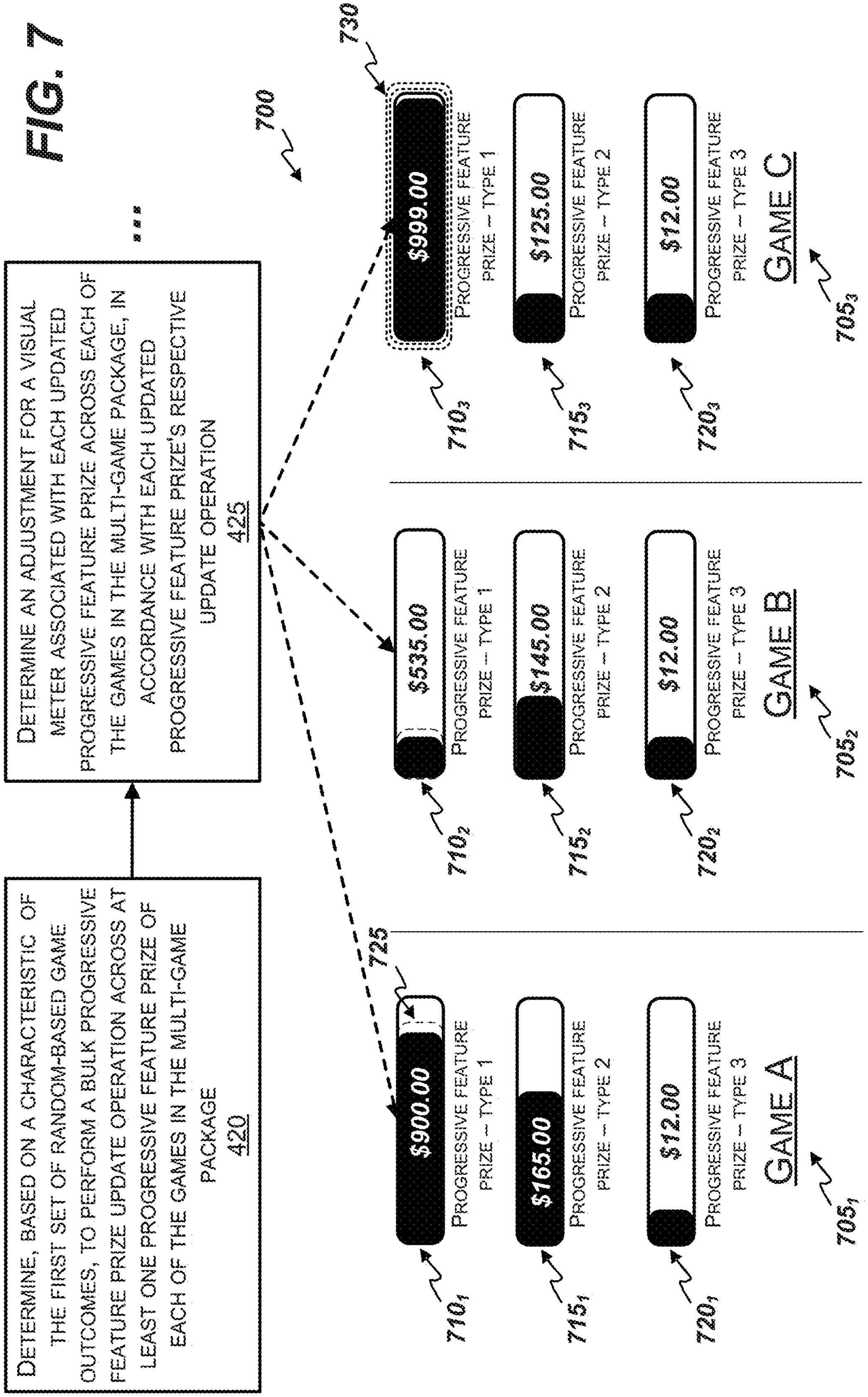

FIG. 7 is a diagram that depicts example UI components 700 for reflecting the bulk updating of multiple types of progressive feature prizes across multiple games in a multi-game package, e.g., as part of a bulk progressive feature prize update operation, such as those that have been described herein. For ease of illustration, FIG. 7 reproduces the contents of blocks 420 and 425 from FIG. 4A and indicates example UI effects that could be implemented on a display of a gaming device in response to the visual meter adjustments determined at block 425 from operation 400 of FIG. 4A.

In particular, FIG. 7 depicts a hypothetical multi-game lobby with three games: game A ($\mathbf{705}_1$), game B ($\mathbf{705}_2$), and game C ($\mathbf{705}_3$). Each of game A ($\mathbf{705}_1$), game B ($\mathbf{705}_2$), and game C ($\mathbf{705}_3$) further comprises three different types of progressive feature prizes. For example: the progressive feature prizes of type 1 ($\mathbf{710}_1$/$\mathbf{710}_2$/$\mathbf{710}_3$) may reflect "major" jackpots that range in value from a floor of $500 to a ceiling (or "soft ceiling") of $1000; the progressive feature prizes of type 2 ($\mathbf{715}_1$/$\mathbf{715}_2$/$\mathbf{715}_3$) may reflect "minor" jackpots that range in value from a floor of $100 to a ceiling (or "soft ceiling") of $250; and the progressive feature prizes of type 3 ($\mathbf{720}_1$/$\mathbf{720}_2$/$\mathbf{720}_3$) may reflect "mini" jackpots that range in value from a floor of $10 to a ceiling (or "soft ceiling") of $50. As illustrated, each jackpot meter 710/715/720 is visually filled to a determined percentage, wherein the fill percentage is determined to reflect how far the current value of jackpot meter is from the respective jackpot's floor and ceiling values. It is to be understood that these types of jackpots and floor/ceiling values are merely exemplary and used for illustrative purposes.

In the example illustrated in FIG. 7, the bulk progressive feature prize update operation has determined to update the respective progressive feature prizes of type 1 for each of games A, B, and C, i.e., the "major jackpots" ($\mathbf{710}_1$/$\mathbf{710}_2$/$\mathbf{710}_3$). The dashed lines in jackpot meters $\mathbf{710}_1$/$\mathbf{710}_2$/$\mathbf{710}_3$, e.g., dashed line 725 in jackpot meter $\mathbf{710}_1$, represent the additional amount that the respective jackpot meters will be filled by as a result of the current bulk progressive feature prize update operation. In this example, the progressive feature prizes of types 2 and 3 for each game in the multi-game package are not being updated, although they may be updated as part of one or more subsequent bulk progressive feature prize update operations.

In this example, the progressive feature prize $\mathbf{710}_3$ of game C ($\mathbf{705}_3$) has reached its "soft ceiling" amount of $999, and thus the jackpot meter for major jackpot $\mathbf{710}_3$ of game C ($\mathbf{705}_3$) is already determined to be visually indicated as being 99% filled, e.g., as discussed above with regard to Table 4. Thus, assuming game C ($\mathbf{705}_3$) is not the game that a player is currently playing, the value of the jackpot meter for major jackpot $\mathbf{710}_3$ may display as values even larger than soft ceiling amount of $1000, i.e., after subsequent update operations, but the meter may remain visually filled at 99% and not actually be triggered to award to the player, i.e., unless or until the next time a bulk update operation is performed on the major jackpot $\mathbf{710}_3$ while the player is playing game C ($\mathbf{705}_3$). At that time, the player may be eligible to be awarded the then-current value of major jackpot $\mathbf{710}_3$, e.g., in accordance with the various trigger equations described above.

As mentioned above, in some implementations, e.g., as shown by the dashed lines 730 around major jackpot $\mathbf{710}_3$ in FIG. 7, a jackpot meter that has met or exceeded its soft ceiling value may have an additional visual indicator applied to it, e.g., a glowing, pulsating, or highlighting effect, etc. This visual indicator may be used to further draw a player's attention to consider playing the game that has a jackpot meter that has already met or exceeded its soft ceiling amount, i.e., in this case, game C ($\mathbf{705}_3$), due to the high probability of major jackpot $\mathbf{710}_3$ being awarded to a player soon.

IV. Alternatives, Variations, and Conclusion

Numerous embodiments are described in this disclosure and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but they may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A method for updating progressive feature prize values across multiple games in a multi-game package, comprising:

loading a multi-game package program that includes a first game and at least a second game, wherein the first game is eligible to trigger a payout of one or more first progressive feature prizes associated with the first game, and wherein the first game is ineligible to trigger a payout of one or more second progressive feature prizes associated with the second game;

initiating a round of play in the first game of the multi-game package; generating a first set of random-based game outcomes for the round of play using a random number generator (RNG);

determining, based on a characteristic of the first set of random based game outcomes, to perform a bulk progressive feature prize update operation across at least one progressive feature prize of each of the games in the multi-game package;

determining an adjustment for a visual meter associated with each updated progressive feature prize across each of the games in the multi-game package, in accordance with each updated progressive feature prize's respective update operation;

generating a second set of random-based game outcomes for the round of play using the RNG; and determining, based on a characteristic of the second set of random based game outcomes, whether one of the one or more first progressive feature prizes in the first game is triggered.

2. The method of claim 1, wherein each of the bulk progressive feature prize update operations performed in the games of the multi-game package complies with return to player (RTP) requirements for each respective game.

3. The method of claim 2, wherein each of the bulk progressive feature prize update operations performed in the games of the multi-game package complies with RTP requirements for each respective game, at least in part, via use of a soft ceiling amount for each of the respective game's progressive feature prizes.

4. The method of claim 1, wherein the progressive feature prize value for the first game in the multi-game package comprises a determined amount by which to increment a jackpot prize in the first game.

5. The method of claim 1, further comprising:

generating a third set of random-based game outcomes for the round of play using the RNG; and determining, based on a characteristic of the third set of random based game outcomes, the value of the progressive feature prize update operations for each of the games in the multi-game package.

6. The method of claim 1, further comprising:

generating a fourth set of random-based game outcomes for the round of play using the RNG; and determining, based on a characteristic of the fourth set of random based game outcomes, which of the progressive feature prizes of each of the games in the multi-game package to update as part of the bulk progressive feature prize update operation.

7. The method of claim 6, wherein determining, based on a characteristic of the fourth set of random based game outcomes, which of the progressive feature prizes of each of the games in the multi-game package to update as part of the bulk progressive feature prize update operation further comprises:

determining to update a same type of progressive feature prize for each of the games in the multi-game package.

8. The method of claim 6, wherein determining, based on a characteristic of the fourth set of random based game outcomes, which of the progressive feature prizes of each of the games in the multi-game package to update as part of the bulk progressive feature prize update operation further comprises:

determining to update a different type of progressive feature prize in each of at least two of the games in the multi-game package.

9. The method of claim 1, wherein the first game is ineligible to trigger a payout of any progressive feature prizes associated with any of the other games in the multi-game package.

10. The method of claim 1, wherein determining an adjustment for a visual meter associated with each updated progressive feature prize across each of the games in the multi-game package, in accordance with its respective progressive feature prize update operation further comprises:

determining a percentage of the visual meter associated with each updated progressive feature prize across each of the games in the multi-game package to fill in based, at least in part, on how close each visual meter is to a respective soft ceiling amount.

11. The method of claim 10, wherein determining an adjustment for a visual meter associated with each updated progressive feature prize across each of the games in the multi-game package, in accordance with its respective progressive feature prize update operation further comprises:

determining a visual indicator to be applied to the visual meter associated with each progressive feature prize across each of the games in the multi-game package that has met or exceeded its respective soft ceiling amount.

12. The method of claim 1, wherein the second game is eligible to trigger a payout of one or more second progressive feature prizes associated with the second game, and wherein the second game is ineligible to trigger a payout of one or more first progressive feature prizes associated with the first game.

13. The method of claim 1, wherein the characteristic of the first set of random based game outcomes comprises a symbol-driven characteristic.

14. One or more computer-readable media storing computer-executable instructions, which, when executed by a computer, cause the computer to perform the following operations:

loading a multi-game package program that includes a first game and at least a second game, wherein the first game is eligible to trigger a payout of one or more first progressive feature prizes associated with the first game, and wherein the first game is ineligible to trigger a payout of one or more second progressive feature prizes associated with the second game;

initiating a round of play in the first game of the multi-game package; generating a first set of random-based game outcomes for the round of play using a random number generator (RNG);

determining, based on a characteristic of the first set of random based game outcomes, to perform a bulk progressive feature prize update operation across at least one progressive feature prize of each of the games in the multi-game package;

determining an adjustment for a visual meter associated with each updated progressive feature prize across each of the games in the multi-game package, in accordance with each updated progressive feature prize's respective update operation;

generating a second set of random-based game outcomes for the round of play using the RNG; and determining, based on a characteristic of the second set of random based game outcomes, whether one of the one or more first progressive feature prizes in the first game is triggered.

15. The one or more computer-readable media of claim 14, wherein each of the bulk progressive feature prize update operations performed in the games of the multi-game package complies with RTP requirements for each respective game.

16. The one or more computer-readable media of claim 15, wherein each of the bulk progressive feature prize update operations performed in the games of the multi-game package complies with RTP requirements for each respective game, at least in part, via use of a soft ceiling amount for each of the respective game's progressive feature prizes.

17. A system comprising:

a display;

one or more processors;

memory; and control logic, implemented using the one or more processors and memory, configured to perform operations to control an electronic gaming device, the operations comprising:

loading a program that includes a first game, wherein the first game is eligible to trigger a payout of one or more first progressive feature prizes associated with the first game;

initiating a round of play in the first game;

generating a first set of random-based game outcomes for the round of play using a random number generator (RNG);

determining, based on a characteristic of the first set of random based game outcomes, to perform a progressive feature prize update operation on at least one progressive feature prize of the first game;

determining an adjustment for a visual meter on the display that is associated with each updated progressive feature prize of the first game, in accordance with each updated progressive feature prize's respective update operation;

generating a second set of random-based game outcomes for the round of play using the RNG; and determining, based on a characteristic of the second set of random based game outcomes, whether one of the one or more first progressive feature prizes in the first game is triggered.

18. The system of claim 17, wherein the operations further comprise:

loading a multi-game package program that includes the first game and at least a second game, wherein the first game is ineligible to trigger a payout of one or more second progressive feature prizes associated with the second game.

19. The system of claim 18, wherein the operations to determine, based on a characteristic of the first set of random based game outcomes, to perform a progressive feature prize update operation further comprise operations to: determine, based on a characteristic of the first set of random based game outcomes, to perform a bulk progressive feature prize update operation across at least one progressive feature prize of each of the games in the multi-game package.

20. The system of claim 17, wherein each of the progressive feature prize update operations performed in the first game complies with RTP requirements for the first game, at least in part, via use of a soft ceiling amount for each of the first game's progressive feature prizes.

* * * * *